(12) United States Patent
Pandurangarao

(10) Patent No.: US 10,169,999 B2
(45) Date of Patent: Jan. 1, 2019

(54) IDENTIFYING ROADWAY OBSTACLES BASED ON VEHICULAR DATA

(71) Applicant: Allstate Solutions Private Limited, Bangalore (IN)

(72) Inventor: Anil Kumar Pandurangarao, Karnataka (IN)

(73) Assignee: Allstate Solutions Private Limited, Bangalore (IN)

( * ) Notice: Subject to any disclaimer, the term of this patent is extended or adjusted under 35 U.S.C. 154(b) by 0 days.

(21) Appl. No.: 15/348,692

(22) Filed: Nov. 10, 2016

(65) Prior Publication Data

US 2018/0130353 A1    May 10, 2018

(51) Int. Cl.
   G08G 1/16     (2006.01)
   G01C 21/36    (2006.01)
   G07C 5/00     (2006.01)

(52) U.S. Cl.
   CPC ......... *G08G 1/164* (2013.01); *G01C 21/3605* (2013.01); *G01C 21/3697* (2013.01); *G07C 5/008* (2013.01)

(58) Field of Classification Search
   CPC ................ G08G 1/164; G01C 21/3605; G01C 21/3697; G07C 5/008
   See application file for complete search history.

(56) References Cited

U.S. PATENT DOCUMENTS

| | | | |
|---|---|---|---|
| 6,487,500 B2 | 11/2002 | Lemelson et al. | |
| 6,831,572 B2 | 12/2004 | Strumolo et al. | |
| 7,295,925 B2 | 11/2007 | Breed et al. | |
| 7,741,962 B2 | 6/2010 | Kalik | |
| 3,018,328 A1 | 9/2011 | Goldstein et al. | |
| 9,096,167 B2 | 8/2015 | Stein et al. | |
| 9,230,442 B2 | 1/2016 | Bowers et al. | |
| 9,269,268 B2 | 2/2016 | Bowers et al. | |
| 2003/0229447 A1 | 12/2003 | Wheatley et al. | |
| 2005/0197771 A1 | 9/2005 | Seick et al. | |

(Continued)

FOREIGN PATENT DOCUMENTS

| | | |
|---|---|---|
| WO | 2010/040403 A1 | 4/2010 |
| WO | 2015/114384 A1 | 8/2015 |

OTHER PUBLICATIONS

Chaves, Stephen M., "Using Kalman Filtering to Improve a Low-Cost GPS-Based Collision Warning System for Vehicle Convoys: A Thesis in Mechanical Engineering," the Pennsylvania State University, May 2010, 122 pages.

(Continued)

*Primary Examiner* — Basil T. Jos

(74) *Attorney, Agent, or Firm* — Banner & Witcoff, Ltd.

(57) ABSTRACT

Apparatuses, systems, and methods are provided for interfacing a roadway obstacle and navigation system with an obstacle identification and route determination system to identify roadway obstacles based on vehicular data. The roadway obstacle and navigation system may receive vehicular data through sensor utilization and communications with electronic devices. The vehicular data may be analyzed by the roadway obstacle and navigation system in conjunction with the obstacle identification and route determination system to identify roadway obstacles. The roadway obstacle and navigation system may use the roadway obstacles to provide safety alerts to drivers.

17 Claims, 9 Drawing Sheets

(56) References Cited

U.S. PATENT DOCUMENTS

| | | |
|---|---|---|
| 2006/0162985 A1 | 7/2006 | Tanaka et al. |
| 2007/0255498 A1 | 11/2007 | McDaniel et al. |
| 2011/0320492 A1 | 12/2011 | Inghelbrecht |
| 2013/0107054 A1* | 5/2013 | Ueoka ............... G01C 21/3697 348/148 |
| 2013/0141576 A1 | 6/2013 | Lord et al. |
| 2013/0154854 A1 | 6/2013 | Chen et al. |
| 2014/0085113 A1 | 3/2014 | Bonhoure et al. |
| 2014/0125474 A1 | 5/2014 | Gunaratne |
| 2014/0379233 A1 | 12/2014 | Chundrlik, Jr. et al. |
| 2015/0291162 A1 | 10/2015 | van Nunen et al. |
| 2015/0304406 A1 | 10/2015 | Penilla et al. |

OTHER PUBLICATIONS

Hiraoka, Toshihiro, et al, "Collision Risk Evaluation Index Based on Deceleration for Collision Avoidance (First Report)—Proposal of a new index to evaluate collision risk against forward obstacles," Departement of Systems Science, Graduate School of Informatics, Kyoto University, Japan, 2007, 9 pages.

"A Comprehensive Examination of Naturalistic Lane-Changes," U.S. Department of Transporation National Highway Traffic Safety Administraction, DOT HS 809 702, Mar. 2004, 235 pages.

Apr. 21, 2017 (WO) International Search Report and Written Opinion—App. PCT/IN2016/60410.

\* cited by examiner

IDENTIFYING ROADWAY OBSTACLES BASED ON VEHICULAR DATA

FIELD

Aspects described herein generally relate to one or more computer systems, servers, and/or other electronic devices including hardware and/or software. In particular, aspects relate to evaluating vehicular data to identify one or more roadway obstacles and, based on the identified one or more roadway obstacles, causing a device to produce an audible tone.

BACKGROUND

Community-based traffic and navigation applications allow users to actively report roadway obstacles encountered during driving so that other users of the application may be apprised of such obstacles in advance of potential encounters. In order to provide an obstacle report, however, users are required to manually enter information associated with the obstacle via a mobile device on which the application is operating. Such a configuration, due to the requisite for active user interaction, may contribute to distracted driving leading to motor vehicle accidents which, in some instances, may cause injury and/or death. Accordingly, in order to address such technological shortcomings, there may be a need for systems and methods for determining roadway obstacles based on vehicular data without necessitating active user input during vehicle operation.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to identifying roadway obstacles based on vehicular data.

Some aspects of the disclosure described herein provide for a roadway obstacle and navigation system. The system may include one or more computing devices, such as a mobile device, an on-board computer associated with a vehicle, or the like. The roadway obstacle and navigation system may be configured to activate one or more communication interfaces and to pair, via the one or more communication interfaces, the mobile device or other computing device with a telematics device and/or vehicle on-board computer of the vehicle. After pairing, the roadway obstacle and navigation system may receive vehicle operational data from the telematics device and/or vehicle on-board computer. The roadway obstacle and navigation system may be further configured to determine whether the vehicle operational data surpasses a predetermined threshold. Responsive to doing so, the roadway obstacle and navigation system may compress the vehicle operational data surpassing the threshold and transmit said data to an obstacle identification and route determination system.

The roadway obstacle and navigation system may further be configured to receive data from an obstacle identification and route determination system corresponding to one or more roadway obstacles, determine a location of the vehicle relative to the roadway obstacles, activate a speaker based on the location of the vehicle relative to the roadway obstacles being within a predetermined threshold, and cause the speaker to produce an audio tone in relation to the location of the vehicle relative to the obstacles.

Additionally, the roadway obstacle and navigation system may be configured to receive navigation information from a user and to compress and transmit such information to the obstacle identification and route determination system. In response, the roadway obstacle and navigation system may receive directions between a location and a destination within the navigation information, as well as information corresponding to one or more roadway obstacles. In order to provide alerts to a user regarding the one or more roadway obstacles, the roadway obstacle and navigation system may be configured to activate speakers and cause the speakers to produce an audible tone.

Other aspects of the disclosure described herein provide for an obstacle identification and route determination system configured to interface with the roadway obstacle and navigation system. The obstacle identification and route determination system may include an obstacle identification server and a route determination server.

The obstacle identification server may be configured to receive vehicular data from one or more roadway obstacle and navigation systems associated with particular vehicles. Based on such data, the obstacle identification server may be able to aggregate the vehicular data in relation to the location and time at which the data was generated to determine whether a roadway obstacle is present on any given segment of roadway.

The route determination server may be configured to receive navigation information from one or more roadway obstacle and navigation systems and, based on the navigation information, to produce a route determination. The route determination may further include data related to one or more roadway obstacles present on the route.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
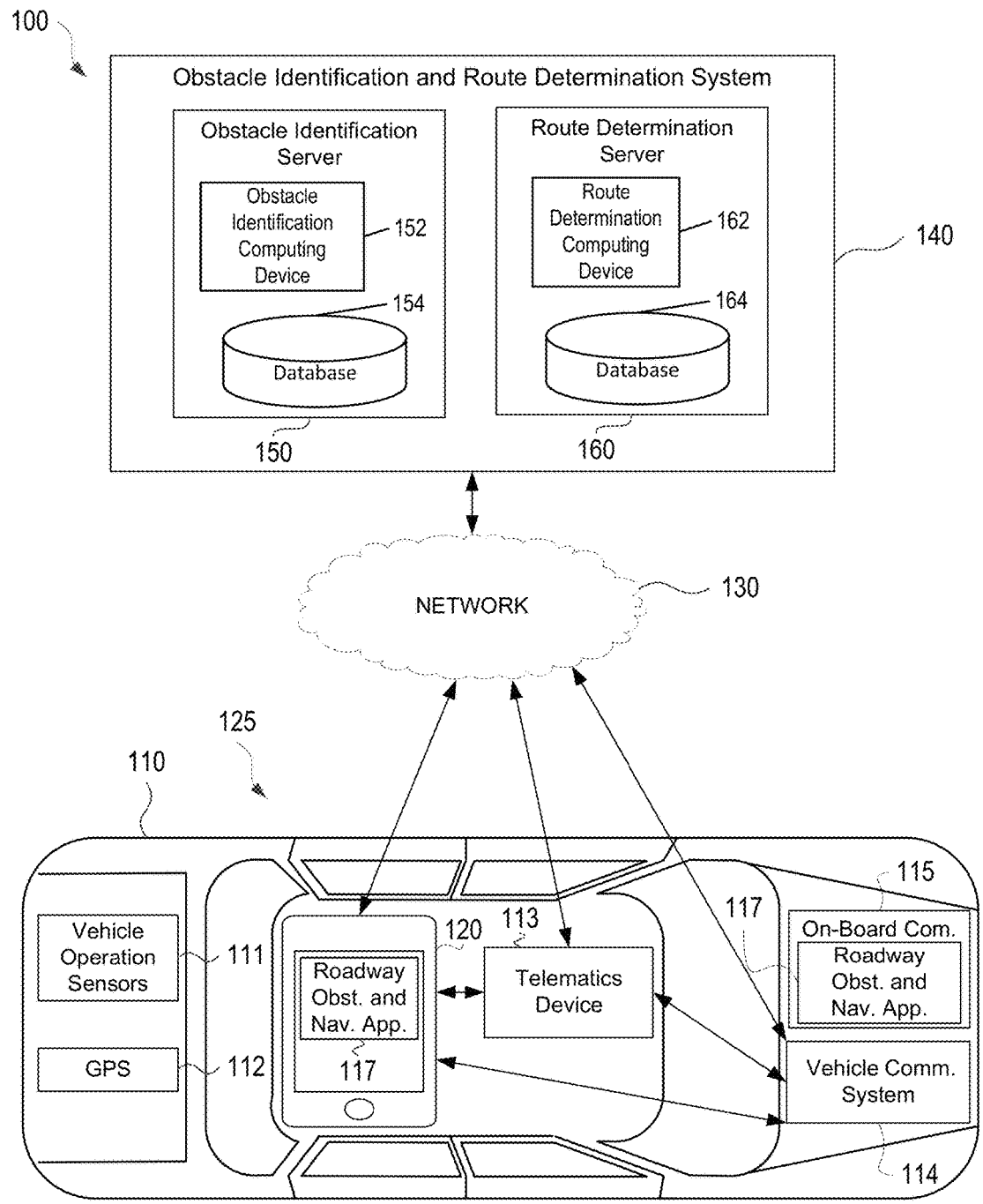
FIG. 1 depicts an example roadway obstacle analysis system according to one or more aspects of the present disclosure.

FIG. 1 is a diagram illustrating various example components of a roadway obstacle analysis system 100 according to one or more aspects of the disclosure. The roadway obstacle analysis system 100 may include roadway obstacle and navigation system 125, a network 130, and an obstacle identification and route determination system 140. The roadway obstacle and navigation system 125 may include a vehicle 110 and one or more components included therein or associated therewith (e.g., vehicle operation sensors 111, GPS 112, telematics device 113, vehicle communication system 114, and on-board computer 115, and the like) and mobile computing device 120. The obstacle identification and route determination system 140 may include obstacle identification server 150 and the components included therein or associated therewith (e.g., obstacle identification computing device 152 and obstacle identification database 154) and route determination server 160 and the components included therein or associated therewith (e.g., route determination computing device 162 and route determination database 164). The roadway obstacle and navigation system 125 and the obstacle identification and route determination system 140 may be configured to communicate with each other through network 130. Each component shown in FIG. 1 may be implemented in hardware, software, or a combination of the two. Additionally, each component of the roadway obstacle analysis and navigation system 100 may include a computing device (or system) having some or all of the structural components described below in regard to computing device 901 of FIG. 9.

Vehicle 110 of the roadway obstacle analysis system 100 may be an automobile, motorcycle, scooter, bus, van, truck, semi-truck, train, boat, recreational vehicle, or other vehicle. The vehicle 110 may further be an autonomous vehicle, semi-autonomous vehicle, or non-autonomous vehicle. In some examples, vehicle 110 may include vehicle operation/performance sensors 111 capable of detecting, recording, and transmitting various vehicle performance and/or operational data and environmental conditions data. For example, sensors 111 may detect, store, and transmit data corresponding to the vehicle's speed, rates of acceleration and/or deceleration, braking, swerving, and the like. Sensors 111 also may detect, store and/or transmit data received from the vehicle's internal systems, such as impact to the body of the vehicle, air bag deployment, headlight usage, brake light operation, door opening and closing, door locking and unlocking, cruise control usage, hazard light usage, windshield wiper usage, horn usage, turn signal usage, seat belt usage, phone and radio usage within the vehicle, internal decibel levels, and other data collected by the vehicle's computer systems.

Sensors 111 also may detect, store, and/or transmit data relating to moving violations and the observance of traffic signals and signs by the vehicle 110. Additional sensors 111 may detect, store, and transmit data relating to the maintenance of the vehicle 110, such as the engine status, oil level, engine coolant temperature, odometer reading, the level of fuel in the fuel tank, engine revolutions per minute (RPMs), and/or tire pressure.

The sensors 111 of vehicle 110 may further include one or more cameras and proximity sensors capable of recording additional conditions inside or outside of the vehicle 110. Internal cameras may detect conditions such as the number of the passengers in the vehicle 110, and potential sources of driver distraction within the vehicle (e.g., pets, phone usage, and unsecured objects in the vehicle). External cameras and proximity sensors may be configured to detect environmental conditions data such as nearby vehicles, vehicle spacing, traffic levels, road conditions and obstacles, traffic obstructions, animals, cyclists, pedestrians, precipitation levels, light levels, sun position, and other conditions that may factor into driving operations of vehicle 110.

Additionally, vehicle sensors 111 may be configured to independently transmit the above-mentioned data to one or more computing devices and/or systems including telematics device 113, on-board computer 115, mobile device 120, and/or obstacle identification and route determination system 140. In some instances, the data transmission to the mobile device 120 and/or obstacle identification and route determination system 140 may be performed via on-board computer 115. In such cases, the on-board computer 115 may be configured to transmit the data received from vehicle sensors 111 to mobile device 120 and/or obstacle identification and route determination system 140 by way of vehicle communication system 114.

Vehicle 110 may include a Global Positioning System (GPS) 112 which may be used to generate data corresponding to the position, heading, orientation, location, velocity, and/or acceleration of vehicle 110. GPS 112 may be configured to independently transmit the above-mentioned data to one or more computing systems including telematics device 113, on-board computer 115, mobile device 120, and/or obstacle identification and route determination system 140. In some instances, the data transmission to the mobile device 120 and/or obstacle identification and route determination system 140 may be performed via on-board computer 115. In such cases, the on-board computer 115 may be configured to transmit the data received from GPS 112 to mobile device 120 and/or obstacle identification and route determination system 140 by way of vehicle communication system 114.

Telematics device 113 may be configured to receive vehicle performance and/or operational data and environmental conditions data in the form of a data stream from on-board computer 115 via a data port, Bluetooth interface, or any comparable communication interface of the vehicle 110. For example, telematics device 113 may include an on-board diagnostic (OBD) device adapter and may be connected to an OBD port of the vehicle 110 through which on-board computer 115 may be configured to transmit data to telematics device 113. In certain embodiments, telematics device 113 may be configured to receive vehicle performance and/or operational data and environmental conditions data directly from vehicle sensors 111, GPS 112, on-board computer 115, and/or mobile device 120 via a wired or wireless connection. Telematics device 113 may include a memory to store data received from vehicle sensors 111, GPS 112, on-board computer 115, and/or mobile device 120.

The vehicle performance and/or operational data may be collected with appropriate permissions (e.g., from the driver, vehicle owner, etc.) and may include operational data from an industry standard port such as a SAE-1962 connector, or an on board diagnostic ("OBD") port or other vehicle data acquiring component. For example, operation data accessible via the OBDII port includes speed and engine throttle position or other variable power controls of the vehicle power source. It may also include so called "extended OBDII" or OBDIII datasets that are specific to each manufacturer and also available with manufacturer permission such as odometer reading, seat belt status, activation of brakes, degree and duration of steering direction, etc., and implementation of accident avoidance devices such as turning signals, headlights, seatbelts, activation of automated braking systems (ABS), etc. Other information regarding the operation of the vehicle may be collected such as, but not limited to, interior and exterior vehicle temperature, window displacement, exterior vehicle barometric pressure, exhaust pressure, vehicle emissions, turbo blower pressure, turbo charger RPM, vehicle GPS location, etc. The system may recognize or be configured to recognize a particular language emitted by the vehicle system and may configure the recording component to receive or convert data in SAE J1850, ISO ISO9141 or KWP 2000 formats. Accordingly, U.S. and/or international OBD standards may be accommodated. For instance, data may be collected from a variety of U.S. and/or international port types to permit use in a variety of locations. Alternatively, this step may be performed by a processor after the data is recorded.

Telematics device 113 may also include sensors such as, but not limited to, an accelerometer, compass, gyroscope, and GPS. Additionally, telematics device 113 may include antennas to communicate with other devices wirelessly. For example, telematics device 113 may communicate with on-board computer 115, mobile device 120, and/or obstacle identification and route determination system 140 over a wide area network (WAN), cellular network, Wi-Fi network, and the like. Telematics device 113 may also communicate with on-board computer 115 and mobile device 120 via a Bluetooth connection. In certain embodiments, telematics device 113 may be configured to establish a secure communication link and/or channel with on-board computer 115, mobile device 120, and/or obstacle identification and route determination system 140.

In some arrangements, telematics device 113 may include a telematics application operating on on-board computer 115 and/or mobile computing device 120 and may utilize hardware components comprised within on-board computer 115 and/or mobile computing device 120 (e.g., memory, processors, communication hardware, etc.) to receive, store, and/or transmit vehicle performance and/or operational data and environmental conditions data.

Vehicle communication systems 114 may be implemented using wireless protocols such as WLAN communication protocols (e.g., IEEE 802.11), Bluetooth (e.g., IEEE 802.15.1), one or more of the Communication Access for Land Mobiles (CALM) wireless communication protocols and air interfaces, and the like. In certain systems, communication systems 114 may include specialized hardware installed in vehicle 110 (e.g., transceivers, antennas, etc.) to facilitate near field communication (NFC) and/or radio-frequency identification (RFID), while in other examples the communication systems 114 may be implemented using existing vehicle hardware components (e.g., radio and satellite equipment, navigation computers). In some instances, the vehicle communication systems 114 may be configured to transmit and receive data from vehicle sensors 111, GPS 112, telematics device 113, on-board computer 115, mobile device 120, and/or obstacle identification and route determination system 140 over a wide area network (WAN), cellular network, Wi-Fi network, Bluetooth, RFID, and/or NFC.

Figure 9:
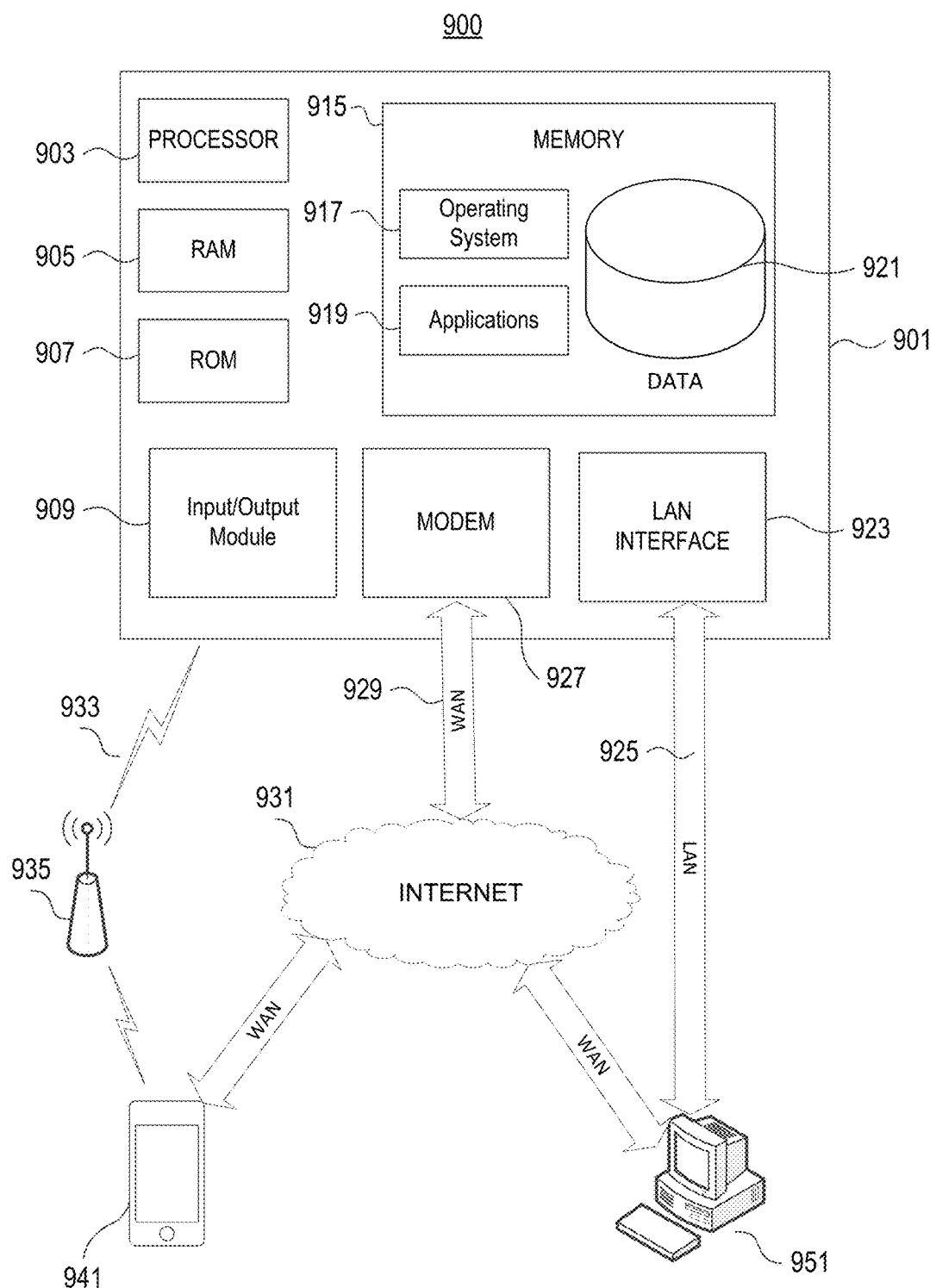
FIG. 9 illustrates an example network environment and computing systems that may be used to implement aspects of the disclosure.

On-board computer 115 may contain some or all of the hardware/software components as the computing device 901 of FIG. 9. Vehicle control computer 115 may be configured to operate one or more internal vehicle systems and/or components including at least a vehicle sound system, dashboard display and/or heads-up display system, output speakers, interior lighting system, climate control system, ignition system, door locking system, and the like. Similarly, on-board computer 115 may be configured to operate one or more external vehicle systems and/or components including windshield wipers, exterior lighting systems (e.g., headlights, tail lights, running lights, turn signals, emergency lights, etc.), emission and exhaust systems, fuel systems, suspension systems, transmission systems, and the like. In some instances, vehicle control computer 115 may be configured to perform the driving event determination, roadway obstacle identification, and navigation methods as described in further detail below in conjunction with mobile computing device 120 and/or obstacle identification and route determination system 140.

Additionally, on-board computer 115 may include a display screen for presenting information to a driver of vehicle 110 pertaining to any of a plurality of applications such as a telematics application, roadway obstacle and navigation application 117, and the like. In some instances, the display screen may be a touch screen and may be configured to receive user touch input. Alternatively, the display screen may not be a touch screen and, instead, the on-board computer 115 may receive user input and provide output through one or more of the input/output modules 909 described in detail in regard to FIG. 9.

Mobile computing device 120 may be, for example, a mobile phone, personal digital assistant (PDA), or tablet computer associated with the driver or passenger(s) of vehicle 110. As such, mobile computing device 120 may be included within the vehicle 110 and, in some instances, may be used to independently collect vehicle driving data and/or to receive vehicle driving and operational/performance data, environmental conditions data, roadway obstacle and navigation data, and the like from one or more computing systems (e.g., vehicle operation sensors 111, GPS 112, telematics device 113, on-board computer 115, and/or obstacle identification and route determination system 140). In one example, software applications executing on mobile computing device 120 (e.g., telematics application and/or roadway obstacle and navigation application 117) may be configured to independently detect driving data and/or to receive vehicle driving data and/or environmental conditions data, roadway obstacle and navigation data, and the like from one or more internal and/or external computing systems. With respect to independent vehicle data detection and collection, mobile device 120 may be equipped with one or more accelerometers and/or GPS systems which may be accessed by software applications executing on mobile computing device 120 to determine vehicle location (e.g., longitude, latitude, and altitude), heading (e.g., orientation), velocity, acceleration, direction, and other driving data. As stated above, mobile computing device 120 may be configured to transmit the independently collected vehicle driving data and/or the received vehicle driving data, environmental conditions data, roadway obstacle and navigation data, and the like to one or more computing devices (e.g., telematics device 113, on-board computer 115, and/or obstacle identification and route determination system 140).

Additionally, mobile computing device 120 may be configured to perform one or more of the methods and/or processes corresponding to driving event determination, roadway obstacle identification, roadway obstacle alert and assessment, and navigation as described in further detail below in conjunction with on-board computer 115 and/or obstacle identification and route determination system 140. In some instances, the methods corresponding to the driving event determination, roadway obstacle identification, roadway obstacle alert and assessment, and navigation may be performed by a roadway obstacle and navigation system 125 causing a roadway obstacle and navigation application 117 to operate or execute on mobile device 120. In performing such methods, mobile device 120 may be configured to detect and store vehicular operational and navigation data, and may be further configured to transmit the vehicular operational and navigation data to on-board computer 115 and/or obstacle identification and route determination system 140. Furthermore, mobile device 120 may be configured to receive vehicle operational data, environmental conditions data, and/or data produced during the performance of the methods corresponding to the driving event determination, roadway obstacle identification, roadway obstacle alert and assessment, and navigation from sensors 111, GPS 112, telematics device 113, on-board computer 115, and/or obstacle identification and route determination system 140.

The roadway obstacle analysis system 100 may include an obstacle identification and route determination system 140 including an obstacle identification server 150 and a route determination server 160. The obstacle identification and route determination system 140 and each of the obstacle identification server 150 and the route determination server 160 may contain some or all of the hardware/software components as the computing device 901 of FIG. 9.

The obstacle identification and route determination system 140 may be a single server containing some or all of the hardware/software components as the computing device 901 of FIG. 9. In such instances, each of the obstacle identification server 150 and the route determination server 160 may be virtual machines operating on the obstacle identification and route determination system 140. Alternatively, the obstacle identification and route determination system 140 may be a plurality of servers containing some or all of the hardware/software components as the computing device 901 of FIG. 9. In such instances, each of the obstacle identification server 150 and the route determination server 160 may be individualized server entities.

In some instances, the analysis of the vehicular data in identifying roadway obstacles and the analysis of the navigation information in determining driving routes, as described in further detail below, may be performed by obstacle identification and route determination system 140. In such instances, any one, or combination of, sensors 111, GPS 112, telematics device 113, on-board computer 115, and mobile device 120 may transmit data to obstacle identification and route determination system 140. Such data may include any of the above-mentioned vehicle driving and operational/performance data, environmental conditions data, navigation data, and the like. Upon receipt of the data, obstacle identification and route determination system 140, alone or in combination, with mobile device 120 and/or on-board computer 115 may be able to perform the processes outlined in FIGS. 2-7.

Obstacle identification server 150 may comprise an obstacle identification computing device 152 configured to receive and process the vehicle driving and operational/performance data and environmental conditions data from one or more electronic devices (e.g., sensors 111, GPS 112, telematics device 113, on-board computer 115, and mobile device 120) from each of a plurality of vehicles to determine whether or not roadway obstacles are present on any given segment of roadway mutually driven by each of the vehicles.

The obstacle identification server 150 may also comprise an obstacle identification database 154 in which obstacle identification computer 152 is configured to store the vehicle driving and operational/performance data, environmental conditions data, and roadway obstacle data. Additionally, obstacle identification server 150 may be configured to transmit data (e.g., roadway obstacle data) to telematics device 113, on-board computer 115, mobile device 120, and route determination server 160. In some instances, obstacle identification server 150 may be optional and the processes performed by obstacle identification server 150 may be distributed to any one, or combination of, mobile device 120 and on-board computer 115.

In particular, the obstacle identification server 150 may be configured to analyze the driving data to identify various driving events that occurred during operation of each of a plurality of vehicles at any given point during the respective operation of the vehicles. Driving events may include, for example, acceleration events, deceleration (braking) events, turning events, lane change events, stopping events, backing up events, and the like which surpass a predetermined threshold corresponding to the event type. For instance, an acceleration event may correspond to a driving event if it surpasses a predetermined threshold of more than 8 mph over a period of one second; a controlled braking event may correspond to a driving event if it surpasses a predetermined threshold of more than 8 mph over a period of one second; and a turning event may correspond to a driving event if it surpasses a predetermined threshold of more than 1.025 g-forces. Such predetermined thresholds as listed above are for illustrative purposes, and one of ordinary skill in the art will readily appreciate that other predetermined thresholds may be utilized. For example, an acceleration event may correspond to a driving event if it surpasses a predetermined threshold of more than 2, 3.5, 5, or 7 mph over a period of one second; a controlled braking event may correspond to a driving event if it surpasses a predetermined threshold more than 2, 3.5, 5, or 7 mph over a period of one second; and a turning event may correspond to a driving event if it surpasses a predetermined threshold of more than 0.5, 0.65, 0.8, 0.95, or 1 g-forces.

In further regard to acceleration events, such events may be associated with vertical, horizontal, and lateral acceleration and/or deceleration surpassing a predetermined threshold. For example, if a vehicle swerves out of the way of an obstacle, a horizontal acceleration event may be determined if the acceleration data indicates that a predetermined threshold was surpassed. As noted above, in some examples, the roadway obstacle and navigation application operating on the on-board computer 115 and/or the mobile computing device 120 may perform some, or all, of the analysis of the driving data and provide indications of driving events.

The obstacle identification server 150 may further be configured to determine whether an aggregate of driving events at a particular location signifies a roadway obstacle at the particular location. In order to associate the aggregate of driving events at a particular location with a roadway obstacle at the particular location, the obstacle identification server 150 may determine whether the determined driving events at the particular location exceed a predetermined threshold of reported events (e.g., 10 or more driving events, 50 or more driving events, 100 or more driving events, 500 or more driving events, etc. associated with a particular geographical location). In the event that the obstacle identification server 150 determines that the determined driving events exceed a predetermined threshold of reported events, the obstacle identification server 150 may identify a roadway obstacle at the particular geographical location.

Furthermore, the determination of a roadway obstacle may further be time dependent. For example, if the reported driving events exceed a predetermined threshold (e.g., 10 or more driving events, 50 or more driving events, 100 or more driving events, 500 or more driving events, etc. associated with a particular geographical location) in a particular time range (e.g., 2 hours, 5 hours, 24 hours, etc.), the obstacle identification server 150 may determine that a roadway obstacle is present at the particular location. Additionally and/or alternatively, the determination of a roadway obstacle may be based on a percentage of roadway obstacle identification and navigation systems 125 (e.g. 60% or greater, 75% or greater, 85% or greater, etc.) providing vehicle operational data determined to have surpassed the predetermined threshold over a particular time range (e.g., 2 hours, 5 hours, 24 hours, etc.).

In some instances, the identified roadway obstacle may further be classified as a permanent and/or temporary obstacle. For instance, a permanent obstacle may relate to a particular time of day (e.g., morning between 7:00 am-9:20 am, evening between 4:00 pm-7:00 pm, etc.) and/or a particular segment of roadway (e.g., hairpin turn on a mountain road, speed bump, transitionary point from paved to gravel/dirt road, etc.). A temporary obstacle may relate to roadway phenomena such as debris, a pot hole, traffic accident, flooded roadway, and the like.

The route determination server 160 may comprise a route determination computer 162 configured to receive and process navigation data (e.g., trip and location data) from any one, or combination of sensors 111, GPS 112, telematics device 113, on-board computer 115, and mobile device 120 to determine a route from an entered location to an entered destination comprised within the trip data. In some instances, the determined route may be a route involving the shortest total roadway travel distance between the entered location and destination. Alternatively, the determined route may be a route involving the least amount of roadway obstacles between the entered location and destination. The route determination server 160 may also comprise a route determination database 164 used to store the route data produced by route determination computer 162, as well as the navigation data received from any one, or combination of sensors 111, GPS 112, telematics device 113, on-board computer 115, and mobile device 120. Additionally, route determination server 160 may be configured to transmit data to telematics device 113, on-board computer 115, mobile device 120, and obstacle identification server 150. In some instances, route determination server 160 may be optional and the processes performed by route determination server 160 may be distributed to any one, or combination of, mobile device 120 and on-board computer 115.

The following steps that are described in regard to FIGS. 2-7 may be implemented by one or more of the components of FIGS. 1 and 9 (described in detail below) and/or other components, including other computing devices configured to perform the functions described herein. Additionally, the methods corresponding to the driving event determination, roadway obstacle identification, roadway obstacle alert and assessment, and navigation are recited in the singular (e.g., in relation to a particular vehicle 110 associated with sensors 111, GPS 112, telematics device 113, on-board computer 115, and mobile device 120). However, one of ordinary skill in the art will readily appreciate that the following description may be applied to a plurality of vehicles, each of which being associated with sensors, GPS, telematics device, on-board computer, and mobile device. Furthermore, while the calculations for determining roadway obstacles based on vehicular data and directions based on navigation data are discussed below in regards to obstacle identification and route determination system 140 and, in particular, the obstacle identification server 150 and the route determination server 160 comprised therein, such calculations may be performed by any one, or combination of, the mobile device, server, telematics device, on-board computer, and the like.

Figure 2:
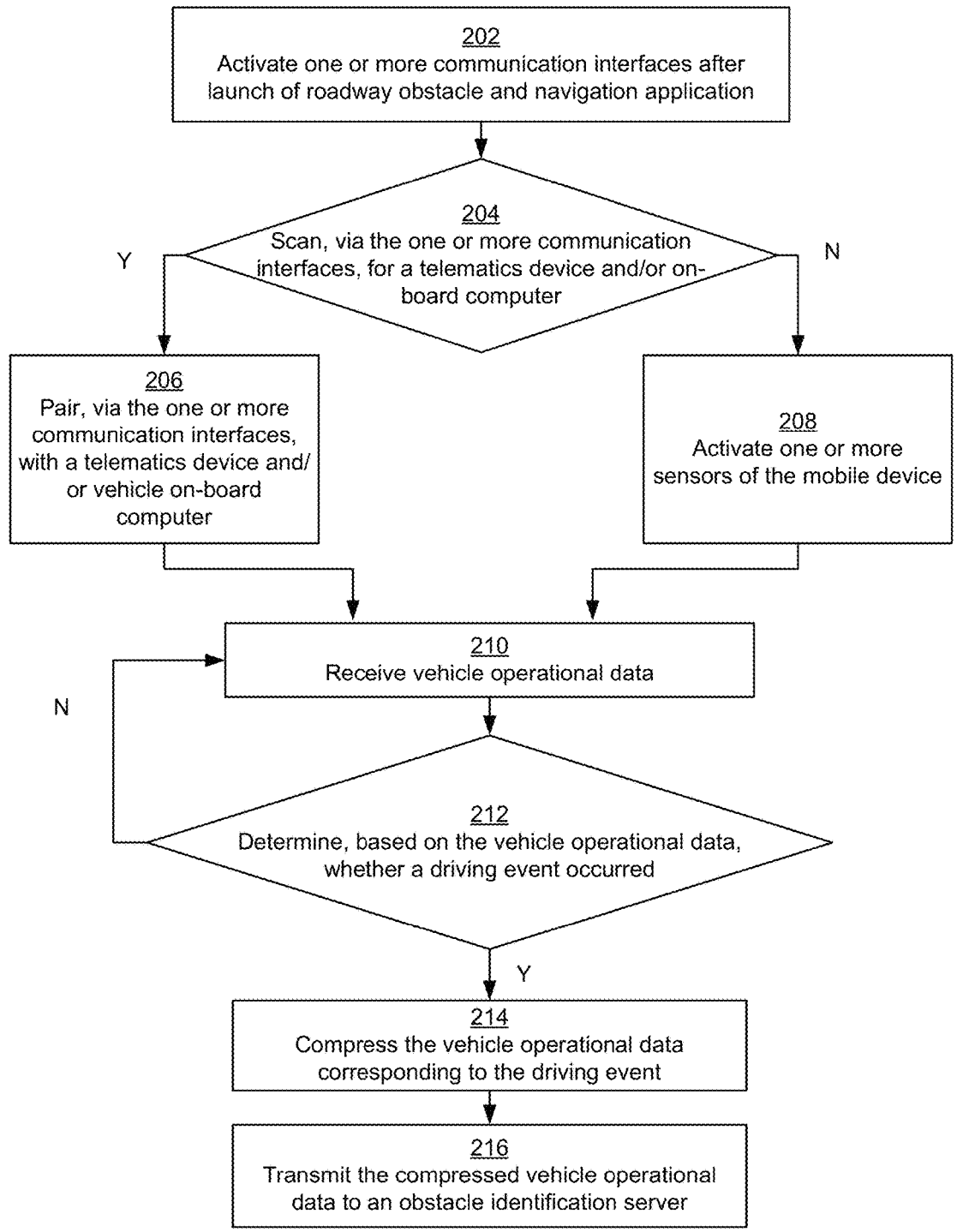
FIG. 2 is a flow diagram illustrating an example of a driving event determination method according to one or more aspects of the disclosure.

FIG. 2 depicts a flow diagram illustrating an example of a driving event determination method according to one or more aspects of the disclosure. In some examples, one or more aspects of the driving event determination method, along with the roadway obstacle identification method, roadway obstacle alert and assessment method, and navigation method described in further detail below, may be included in and/or performed by the roadway obstacle and navigation system 125. For instance, a roadway obstacle and navigation application 117 downloaded from obstacle identification and route determination system 140 and executing on one or more of on-board computer 115 and mobile device 120 of the system 125 may perform one or more aspects described herein. The downloaded application may interface with obstacle identification and route determination system 140 and roadway obstacle and navigation system 125 to perform one or more of the processes described herein. Additionally and/or alternatively, the roadway obstacle and navigation application 117 may be a web-based application operating on obstacle identification and route determination system 140. In such instances, on-board computer 115 and/or mobile device 120 may access a webpage associated with obstacle identification and route determination system 140 in order to perform one or more processes of the driving event determination method, roadway obstacle identification method, roadway obstacle alert and assessment method, and navigation method described herein. While the description of FIG. 2 is provided in relation to mobile device 120, it should be understood that on-board computer 115 or a combination of on-board computer and mobile device 120 may be able to perform the following functions.

At step 202, one or more communication interfaces (e.g., Bluetooth, WiFi, etc.) associated with mobile device 120 are activated after the launch of roadway obstacle and navigation application 117. In some instances, the communication interfaces may be activated by the roadway obstacle and navigation system 125. Additionally and/or alternatively, the communication interfaces may be activated by obstacle identification and route determination system 140 via a web-browser accessing obstacle identification and route determination system 140 operating on mobile device 120.

At step 204, after the one or more communication interfaces are activated, the roadway obstacle and navigation system 125 may scan for the presence of a telematics device 113 and/or on-board computer 115 of a vehicle 110 in the proximity of the mobile device 120. In the event that a telematics device 113 and/or on-board computer 115 is detected or identified during the scan conducted by the mobile device 120, the roadway obstacle and navigation system 125 may instruct the mobile device 120 to pair with the telematics device 113 and/or on-board computer 115 at step 206.

Alternatively, if a telematics device 113 and/or on-board computer 115 are not detected during the scan, the roadway obstacle and navigation system 125 may activate one or more sensors of mobile device 120 (e.g., GPS system and an accelerometer) at step 208. As discussed below, the vehicular data used in performing the identification of roadway obstacles may be determined by one or more of the activated GPS and accelerometer.

At step 210, the roadway obstacle and navigation system 125 may receive vehicle operational data from the telematics device 113 and/or on-board computer 115 of vehicle 110. In particular, such data may correspond to the location (e.g., longitude, latitude, and altitude), heading (e.g., orientation), velocity, and acceleration of the vehicle 110, as well as other data related to the operative state of vehicle systems such as steering, navigation, braking, and the like. In instances in which the roadway obstacle and navigation system 125 was unable to pair with telematics device 113 and/or vehicle on-board computer 115, vehicle operational data may be determined via one or more of the activated GPS system and accelerometer of the mobile device 120 associated with vehicle 110.

At step 212, in response to receiving the vehicle operational data provided by the telematics device 113 and/or on-board computer 115, the roadway obstacle and navigation system 125 may analyze the data to determine if a driving event occurred (e.g., if the vehicle operational data surpasses a threshold of any of a plurality of types of thresholds). As stated above, driving events may include acceleration events, deceleration (braking) events, turning events, lane change events, stopping events, backing up events, and the like which surpass a predetermined threshold corresponding to the event type. In further regard to acceleration events, such events may be associated with vertical, horizontal, and lateral acceleration and/or deceleration surpassing a predetermined threshold.

If, in step 212, one or more threshold are surpassed and a driving event is determined to have occurred, the roadway obstacle and navigation system 125 may isolate the vehicle operational data corresponding to the driving event including the value and type (e.g., vertical, horizontal, and lateral acceleration and/or deceleration) associated with the data surpassing the threshold, as well as the geographical location and time at which the data was determined in step 214. The system 125 may also compress the isolated data. The compression performed by the roadway obstacle and navigation system 125 may be either lossy or lossless. In particular, compression may be performed using prefix codes, Huffman codes, arithmetic coding, run-length coding, move-to-front coning, residual coding, context coding, Lempel-Ziv algorithms, Burrows Wheeler algorithms, scalar and vector quantization, and/or wavelet, fractal, and model-based compression.

Alternatively, the determination of whether a driving event occurred may be performed by obstacle identification server 150 of obstacle identification and route determination system 140. In such instances, the roadway obstacle and navigation system 125 may be configured to transmit some, or all, of the vehicle operational data received from telematics device 113 and/or on-board computer 115 of vehicle 110 and/or determined independently at mobile device 120 to obstacle identification server 150 without performing the determination. The roadway obstacle and navigation system 125 may or may not compress the data prior to transmitting the data to obstacle identification server 150. In some instances, the telematics device 113 and/or on-board computer 115 may be configured to directly transmit some, or all, of the vehicle operational data to obstacle identification server 150 without first transmitting the vehicle operational data to the mobile device 120.

If, in step 212, the roadway obstacle and navigation system 125 determines that the vehicle operational data does not surpass the predetermined threshold and that a driving event has not occurred, the process may return to step 210.

At step 216, the roadway obstacle and navigation system 125 may transmit the compressed vehicle operational data corresponding to the driving event to obstacle identification and navigation system 140. In order to conserve bandwidth, reduce processing power, and conserve energy expenditure of mobile device 120, the data transmitted by the roadway obstacle and navigation system 125 may only correspond to vehicle operational data determined to have surpassed the predetermined threshold (e.g., vehicle operational data determined to relate to a driving event) at step 208. Moreover, by compressing the vehicle operational data determined to have surpassed the predetermined threshold prior to transmittal, data usage may be further reduced.

Figure 3:
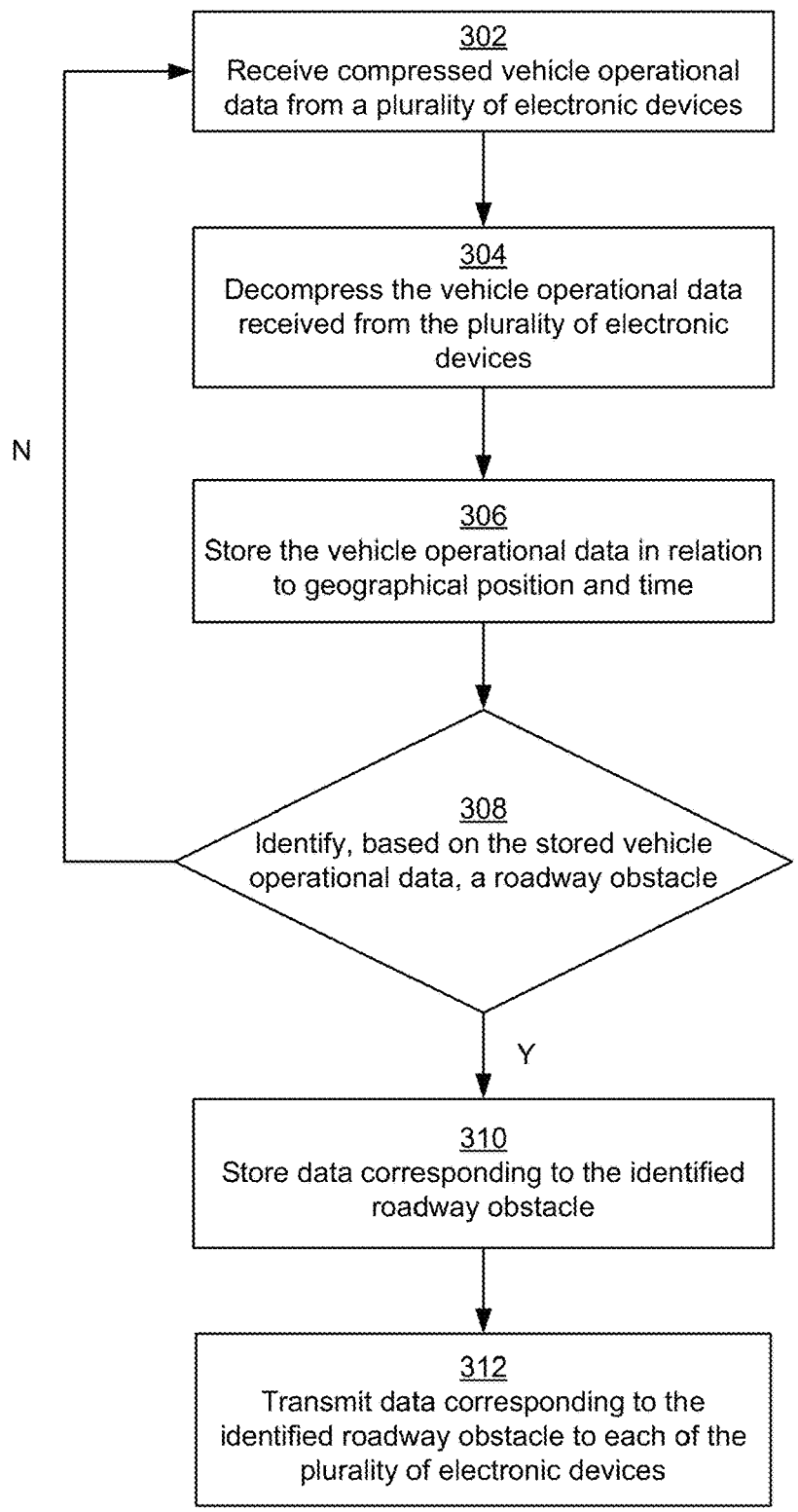
FIG. 3 is a flow diagram illustrating an example of a roadway obstacle identification method according to one or more aspects of the disclosure.

FIG. 3 depicts a flow diagram illustrating a roadway obstacle identification method according to one or more aspects of the disclosure. The method of FIG. 3 at step 302 the obstacle identification server 150 of the obstacle identification and route determination system 140 may receive compressed vehicle operational data from a plurality roadway obstacle and navigation systems 125. Each of the plurality of roadway obstacle and navigation systems 125 may be associated with a particular vehicle. As stated above, the compressed data may correspond to vehicle operation data determined by the roadway obstacle and navigation system 125 to have surpassed a predetermined threshold and correspond to a driving event. Alternatively, the obstacle identification server 150 may receive vehicle operational data from any one, or combination of, mobile device 120, telematics device 113, and on-board computer 115 respective to each of a plurality of vehicles of each of the plurality of roadway obstacle and navigation system 125, in either a compressed or non-compressed state, wherein the vehicle operational data has yet to have been determined to have surpassed the predetermined threshold associated with a driving event.

In instances in which the compressed data was previously determined by the roadway obstacle and navigation system 125 to have surpassed the predetermined threshold and correspond to a driving event, the obstacle identification server 150, upon receipt of the compressed data, may decompress the data at step 304 via decompression algorithms that mirror the compression method performed by the roadway obstacle and navigation system 125 as described above in regard to step 214 of FIG. 2.

Conversely, in instances in which the data was not previously determined by the roadway obstacle and navigation system 125 to correspond to a driving event, the obstacle identification server 150, in cases in which the data is compressed, may decompress the data at step 304 and may analyze the data to determine if a threshold of any of a plurality of types was surpassed (similar to step 212 in FIG. 2). As stated above, driving events may include acceleration events, deceleration (braking) events, turning events, lane change events, stopping events, backing up events, and the like which surpass a predetermined threshold corresponding to the event type. In further regard to acceleration events, such events may be associated with vertical, horizontal, and lateral acceleration and/or deceleration surpassing a predetermined threshold.

In the event that it is determined that a threshold is surpassed and that a driving event occurred, the obstacle identification server 150 may isolate the vehicle operational data corresponding to the surpassed threshold including the value and type (e.g., vertical, horizontal, and lateral acceleration and/or deceleration) associated with the data surpassing the threshold, as well as the geographical location and time at which the data was determined.

Alternatively, in instances in which the data was not previously determined by the roadway obstacle and navigation system 125 to have surpassed the predetermined threshold, the obstacle identification server 150, in cases in which the data is not compressed, may not perform step 304 and instead may analyze the data to determine whether a driving event occurred.

The obstacle identification server 150 may store the vehicle operational data determined to have surpassed the predetermined threshold and thereby correspond to a driving event in obstacle identification database 154 in accordance with the geographical location and time at which the vehicle operation data was determined at step 306.

At step 308, the obstacle identification server 150 may identify, based on the stored vehicle operational data entries determined to correspond to a driving event, whether a roadway obstacle is present at any of the respective locations associated with the stored vehicle operational data entries. In the event that the stored data entries of vehicle operational data corresponding to driving events surpass a predetermined threshold of entries (e.g., 10 or more stored entries, 50 or more stored entries, 100 or more stored entries, 500 or more stored entries, etc. associated with a particular geographical location), the obstacle identification server 150 may identify a roadway obstacle at the particular geographical location. The identified roadway obstacle may further be classified as a permanent and/or temporary obstacle. For instance, a permanent obstacle may relate to a particular time of day (e.g., morning between 7:00 am-9:20 am, evening between 4:00 pm-7:00 pm, etc.) and/or a particular segment of roadway (e.g., hairpin turn on a mountain road, speed bump, transitionary point from paved to gravel/dirt road, etc.). A temporary obstacle may relate to roadway phenomena such as debris, a pot hole, traffic accident, flooded roadway, and the like.

In some instances, the determination of a roadway obstacle may further be time dependent. For example, if stored data entries provide data determined to have surpassed a predetermined threshold and thereby correspond to a driving event at a particular geographical location in a particular time range (e.g., 2 hours, 5 hours, 24 hours, etc.), the obstacle identification server 150 may determine that a roadway obstacle is present at the particular location. Additionally and/or alternatively, the determination of a roadway obstacle may be based on a percentage of roadway obstacle identification and navigation systems (e.g. 60% or greater, 75% or greater, 85% or greater, etc.) providing vehicle operational data determined to have surpassed the predetermined threshold over a particular time range (e.g., 2 hours, 5 hours, 24 hours, etc.).

In the event that obstacle identification server 150 fails to identify a roadway obstacle, the process may return to step 302. Conversely, if the obstacle identification server 150 does identify a roadway obstacle, the process may proceed to step 310. At step 310, the obstacle identification server 150 may store data corresponding to the identified roadway obstacle in the obstacle identification database 154.

At step 312, the obstacle identification server 150 may transmit data corresponding to the identified roadway obstacle to each of the roadway obstacle identification and navigation systems 125. The data corresponding to the roadway obstacle may indicate the type of obstacle (e.g., permanent or temporary) and the location corresponding to the obstacle. In some instances, the data may be compressed by obstacle identification server 150 prior to transmittal.

Additionally and/or alternatively, the obstacle identification server 150 may determine whether to transmit data corresponding to the identified roadway obstacle to one or more roadway obstacle and navigation systems 125 in response to a periodic location update corresponding to the vehicle associated with each of the roadway obstacle and navigations systems 125. The data comprising the periodic location update may include location information associated with the vehicle 110 and may be provided in set intervals (e.g., every 5 seconds, 25 seconds, 1 minute, etc.). The obstacle identification server 150 may analyze the periodic location update information to determine if the vehicle associated with the roadway obstacle and navigation system 125 has entered within a predetermined distance buffer (e.g., 1 mile, 5 miles, 10 miles, etc.) around the location corresponding to the identified roadway obstacle. In the event that the vehicle has entered within the predetermined distance buffer, the obstacle identification server 150 may provide the data corresponding to the identified roadway obstacle to the roadway obstacle and navigation system 125 corresponding to the vehicle.

Figure 4:
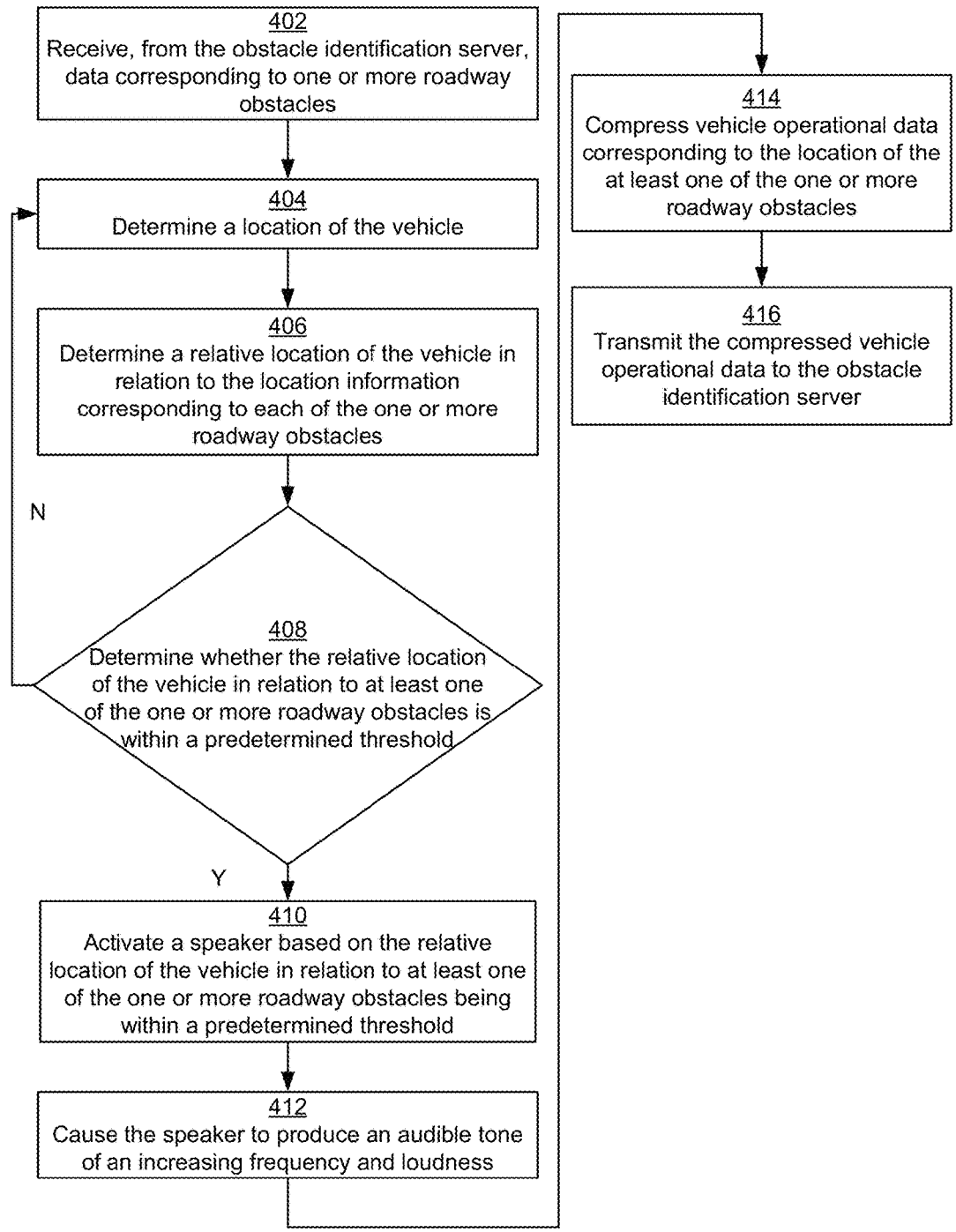
FIG. 4 is a flow diagram illustrating an example of a roadway obstacle alert and assessment method according to one or more aspects of the disclosure.

FIG. 4 flow diagram illustrating an example of a roadway obstacle alert and assessment method according to one or more aspects of the disclosure. At step 402, the roadway obstacle and navigation system 125 may receive data corresponding to one or more roadway obstacles from obstacle identification server 150. As stated above, the data corresponding to the roadway obstacle may indicate the type of obstacle (e.g., permanent or temporary) and the location corresponding to the obstacle. In some instances, the data corresponding to the one or more roadway obstacles may be compressed. In such instances, the roadway obstacle and navigation operating 117 on mobile device 120 may decompress the received data.

After receiving data corresponding to the one or more roadway obstacles, the roadway obstacle and navigation system 125 may determine a location of the vehicle 110 at step 404. In determining the location of the vehicle 110, the roadway obstacle and navigation system 125 may request location data of the vehicle 110 from telematics device 113 and/or on-board computer 115. Alternatively, in instances in which roadway obstacle identification and navigation system 125 was unable to pair with telematics device 113 and/or vehicle on-board computer 115, location data of vehicle 110 may be determined via the activated GPS system and accelerometer of the mobile device 120 associated with vehicle 110. In any case, the roadway obstacle and navigation system 125 may determine a relative location of the vehicle 110 in relation to each of the one or more roadway obstacles by comparing the data corresponding to the location of vehicle 110 to the location information of each of the one or more roadway obstacles at step 406.

At step 408, the roadway obstacle and navigation system 125 may determine whether the relative location of the vehicle 110 to at least one of the one or more roadway obstacles is within a predetermined threshold (e.g., 1000 feet, 500 feet, 100 feet, etc.). In the event that the relative location of the vehicle 110 to the one or more roadway obstacles is not within a predetermined threshold, the process may return to step 404. Conversely, in the event that the relative location of the vehicle 110 to at least one of the one or more roadway obstacles is within a predetermined threshold, the process may proceed to step 410.

At step 410, responsive to determining that the relative location of the vehicle 110 to at least one of the one or more roadway obstacles is within a predetermined threshold, the roadway obstacle and navigation system 125 may transmit a signal to mobile device 120 to activate a speaker associated with mobile device 120. In some instances, roadway obstacle and navigation system 125 may also activate a vibratory mechanism of mobile device 120. Additionally and/or alternatively, the roadway obstacle and navigation system 125 may transmit instructions to on-board computer 115 of vehicle 110 to activate a speaker system of vehicle 110.

At step 410, based on the location of vehicle 110 approaching that of at least one of the one or more roadway obstacles (e.g., the relative location between the vehicle 110 and the roadway obstacle decreasing), the roadway obstacle and navigation system 125 may cause the activated speaker of mobile device 120 to emit an audible tone of an increasing frequency and loudness proportional to the relative distance between the vehicle 110 and the at least one of the one or more roadway obstacles. For instance, the roadway obstacle and navigation system 125 may transmit a signal to the mobile device 120 to generate an audible signal or tone that may be emitted via the activated speaker. In some instances, the roadway obstacle and navigation system 125 may also cause the vibratory mechanism of mobile device 120 to vibrate in proportion to the relative distance between the vehicle 110 and the roadway obstacle. Such vibrations may be intermittent initially, but may approach a constant vibratory state as the vehicle 110 approaches the obstacle (e.g., as a distance between the vehicle and the obstacle is reduced). Additionally and/or alternatively, the roadway obstacle and navigation system 125 may transmit instructions to on-board computer 115 of vehicle 110 to produce an audible tone similar to that produced by mobile device 120.

At step 412, after passing the at least one of the one or more roadway obstacles, the roadway obstacle and navigation system 125 may compress vehicle operation data received from one or more of the telematics device 113 and the on-board computer 115 corresponding to the location of the at least one of the one or more roadway obstacles. In instances in which the roadway obstacle and navigation system 125 was unable to pair with telematics device 113 and/or vehicle on-board computer 115 and vehicle operational data is determined via one or more of the activated GPS system and accelerometer of the mobile device 120 associated with vehicle 110, such data may be compressed as well.

After the vehicle operation data corresponding to the location of the at least one of the one or more roadway obstacles is compressed by roadway obstacle and navigation system 125, the compressed data may be transmitted by the roadway obstacle and navigation system 125 to obstacle identification server 150 at step 414.

Figure 5:
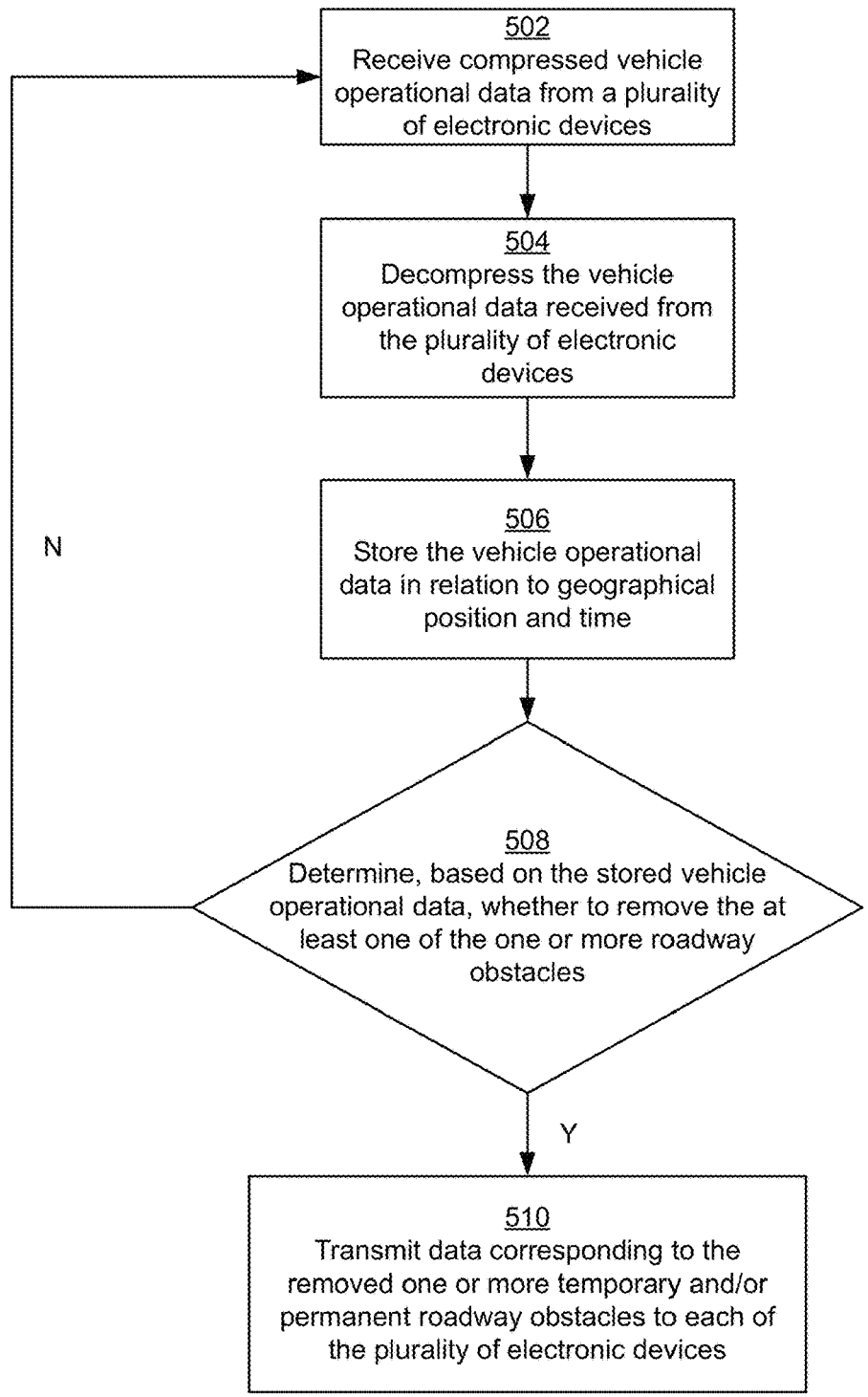
FIG. 5 is a flow diagram illustrating another example of a roadway obstacle alert and assessment method according to one or more aspects of the disclosure.

FIG. 5 is a flow diagram illustrating another example of a roadway obstacle alert and assessment method according to one or more aspects of the disclosure. The method of FIG. 5 may commence at step 502 wherein the obstacle identification server 150 of the obstacle identification and route determination system 140 may receive compressed vehicle operational data from a plurality roadway obstacle and navigation systems. Each of the plurality of roadway obstacle and navigation systems may be associated with a particular vehicle. As stated above, the compressed data may correspond to vehicle operation data corresponding to the location of the at least one of the one or more roadway obstacles. Alternatively, the obstacle identification server 150 may receive vehicle operational data from any one, or combination of, mobile device 120, telematics device 113, and on-board computer 115 respective to each of a plurality of vehicles of each of the plurality of roadway obstacle and navigation system 125, in either a compressed or non-compressed state, corresponding to the location of the at least one of the one or more roadway obstacles.

At step 504, upon receipt of the compressed data from the roadway obstacle and navigation systems respective to each of a plurality of vehicles, obstacle identification server 150 may decompress the data via decompression algorithms that mirror the compression method performed by the roadway obstacle and navigation system 125 as described above. Conversely, in instances in which the data was not compressed, the obstacle identification server 150 my skip step 504 and proceed to step 506. At step 506, the obstacle identification server 150 may store the vehicle operational data in obstacle identification database 154 in relation to the geographical position and time at which the data was determined.

At step 508, the obstacle identification server 150 may determine, based on the stored vehicle operation data corresponding to the location of the at least one of the one or more roadway obstacles, whether to remove the data corresponding to the at least one of the one or more roadway obstacles stored in database 154. In performing the determination, obstacle identification server 150 may analyze each of the stored vehicle operational data entries corresponding to the location of the at least one of the one or more roadway obstacles to determine whether or not each of the stored vehicle operational data entries surpassed a predetermined threshold at the geographical location corresponding to the roadway obstacle and thereby correspond to a driving event. In order to remove the roadway obstacle, obstacle identification server 150 may determine that a particular threshold of stored data entries (e.g., 10 or more stored entries, 20 or more stored entries, 100 or more stored entries, 500 or more stored entries, etc.) corresponding to the location of the roadway obstacle did not surpass a predetermined data threshold and do not correspond to a driving event. In some instances, the determination of whether or not to remove the roadway obstacle may further be time dependent. For example, if stored data entries provide data determined not to have surpassed a predetermined threshold at the geographical location corresponding to the at least one of the one or more roadway obstacles in a particular time range (e.g., 2 hours, 5 hours, 24 hours, etc.), the obstacle identification server 150 may determine that the roadway obstacle should be removed. Additionally and/or alternatively, the determination of whether or not to remove a roadway obstacle may be based on a percentage of stored data entries (e.g. 60% or greater, 75% or greater, 85% or greater, etc.) providing vehicle operational data determined not to have surpassed the predetermined threshold over a particular time range (e.g., 2 hours, 5 hours, 24 hours, etc.).

In the event that obstacle identification server 150 determines not to remove the roadway obstacle, the process may return to step 502. Conversely, if the obstacle identification server 150 does determine to remove the roadway obstacle, the process may proceed to step 510. At step 510, the obstacle identification server 150 may transmit data corresponding to the removal of the roadway obstacle to each of the roadway obstacle identification and navigation systems. The data corresponding to the roadway obstacle may indicate that the obstacle has been removed and the location corresponding to the obstacle. In some instances, the data may be compressed by obstacle identification server 150 prior to transmittal.

Figure 6:
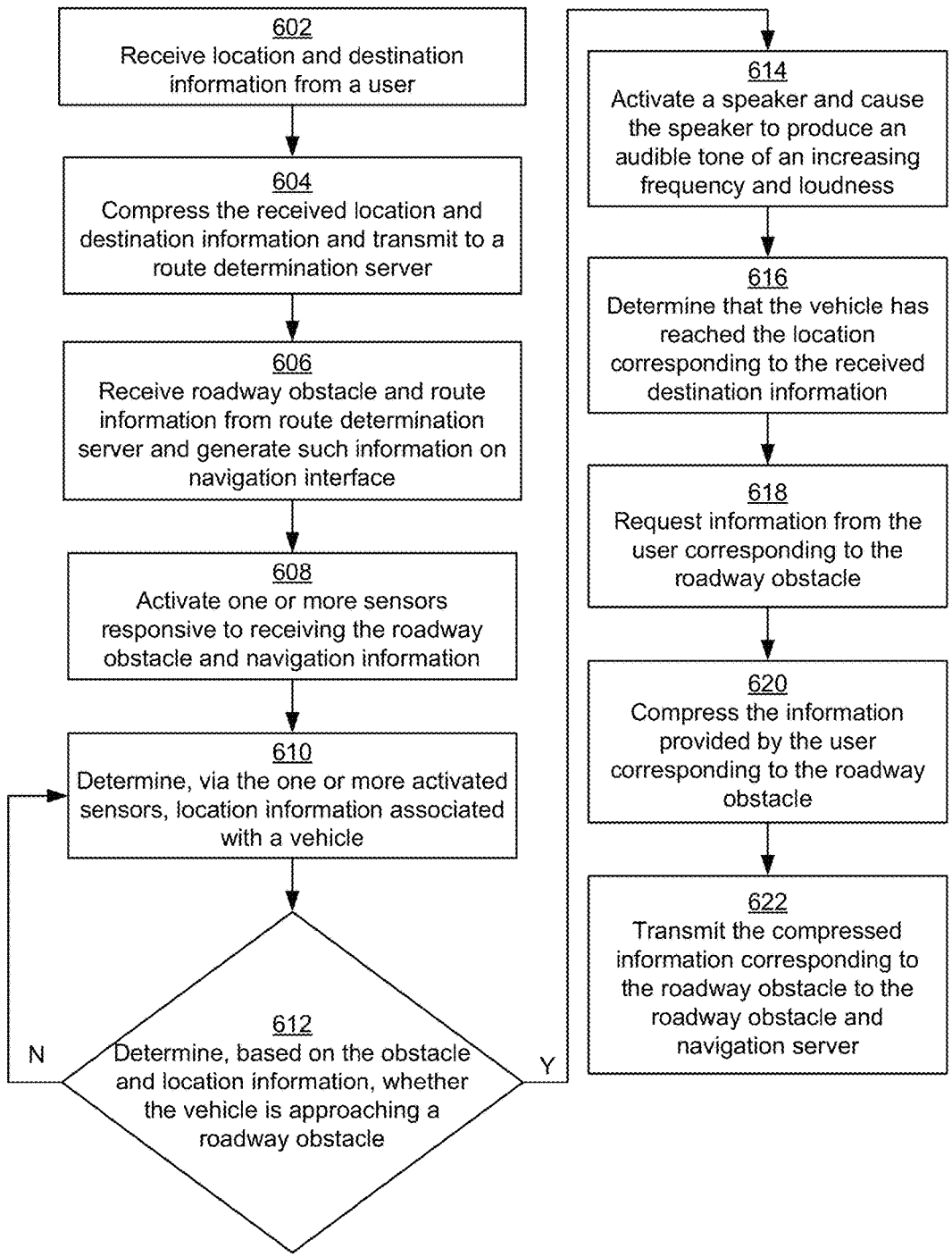
FIG. 6 is a flow diagram illustrating an example of a navigation method according to one or more aspects of the disclosure.

FIG. 6 is a flow diagram illustrating an example of a navigation method according to one or more aspects of the disclosure. In step 602 the roadway obstacle and navigation system 125 may receive location navigation information (e.g., location and destination information) from a user through an input interface (e.g., touch screen, keypad, etc.) of mobile device 120.

Figure 8B:
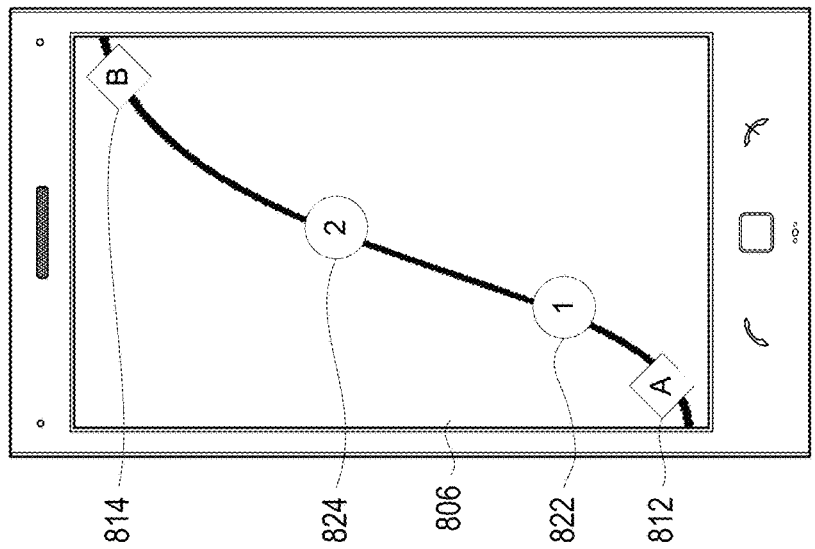
FIGS. 8A and 8B depict example navigation interfaces according to one or more aspects of the disclosure.
Figure 8A:
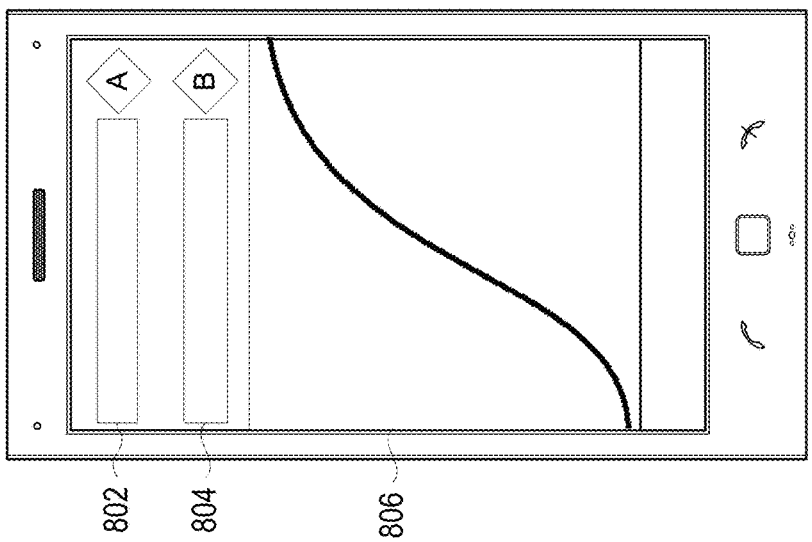

For example, as shown in FIG. 8A, the roadway obstacle and navigation system 125 may provide a navigation interface to a user including entry field 802 corresponding to the location information (e.g., departure address), entry field 804 corresponding to the destination information (e.g., destination address), and map 806. In regard to step 602, the roadway obstacle and navigation system 125 may be configured to receive a departure address from the user in entry field 802 and a destination address in entry field 804.

After receiving the navigation information, the roadway obstacle and navigation system 125 may compress the received location and destination information and transmit the compressed navigation information to obstacle identification and route determination system 140 and, in particular, to route determination server 160 at step 604.

At step 606, the roadway obstacle and navigation system 125 may receive roadway obstacle and route information from route determination server 160 in relation to the location and destination information provided at step 602. Additionally, and after receiving the roadway obstacle and route information, the roadway obstacle and navigation system 125 may generate and/or render the roadway obstacle and route information on the navigation interface. For example, as shown in FIG. 8B, the roadway obstacle and navigation system 125 may annotate map 806 with data points 812 and 814 corresponding to the location and destination information, respectively, received from the user at step 602. Additionally, the roadway obstacle and navigation system 125 may generate any roadway obstacles (e.g., 822 and 824, for example) determined by route determination server 160, as described in further detail below, along the determined route between data points 812 and 814 (e.g., location and destination). The roadway obstacles 822 and 824 may be flags, pins, and/or other user interface elements. In some instances, the roadway obstacles 822 and 824 may be of a particular color and/or type (e.g., flag, pint, and/or other user interface elements) based on the class of roadway obstacle which it signifies (e.g., temporary or permanent obstacle) and the type of obstacle within the class of roadway obstacle (e.g., pot hole, roadway debris, and the like for temporary obstacles and traffic, speed bump, and the like for permanent obstacles).

At step 608, the roadway obstacle and navigation system 125 may activate one or more of a GPS system and an accelerometer associated with the mobile device 120. As discussed below, the vehicle operational data and navigation data used in performing the identification of roadway obstacles and navigation functions may be determined by one or more of the activated GPS and accelerometer. At step 610, the roadway obstacle and navigation system 125 may determine, via one or more of the activated GPS system and accelerometer, location information associated with a vehicle 110.

At step 612, the roadway obstacle and navigation system 125 may determine, based on the location information corresponding to the vehicle determined at step 610 and location information corresponding to the roadway obstacles on the route between the location and destination provided by route determination server 160, whether the vehicle 110 is approaching one or more of the roadway obstacles. In the event that the roadway obstacle and navigation system 125 determines that the vehicle is not approaching the location corresponding to the roadway obstacles, the process may return to step 610. Conversely, if the roadway obstacle and navigation system 125 determines that the vehicle 110 is approaching a roadway obstacle, the process may proceed to step 614.

At step 614, the roadway obstacle and navigation system 125 transmit a signal to mobile device 120 to activate a speaker associated with mobile device 120. In some instances, roadway obstacle and navigation system may also activate a vibratory mechanism of mobile device 120. Additionally, based on the location of vehicle 110 approaching that of the roadway obstacle (e.g., the relative location between the vehicle 110 and the roadway obstacle decreasing), the roadway obstacle and navigation system 125 may cause the activated speaker of mobile device 120 to produce an audible tone of an increasing frequency and loudness proportional to the relative distance between the vehicle 110 and the at least one of the one or more roadway obstacles. In some instances, the roadway obstacle and navigation system 125 may also cause the vibratory mechanism of mobile device 120 to vibrate in proportion to the relative distance between the vehicle 110 and the roadway obstacle. Such vibrations may be intermittent initially, but may approach a constant vibratory state as the vehicle 110 approaches the obstacle.

At step 616, the roadway obstacle and navigation system 125 may determine that the vehicle 110 has reached the location corresponding to the destination information received at step 602. Such a determination may be performed by matching the location information of vehicle 110 to that of the previously provided destination. After determining that the vehicle has reached the location corresponding to the received destination information, the roadway obstacle and navigation system 125 may request, via the navigation interface, for the user to provide additional information corresponding to the roadway obstacles encountered during the drive at step 618. In particular, roadway obstacle and navigation system 125 may request that the user provide information related to the class of the roadway obstacle which (e.g., temporary or permanent obstacle) and the type of obstacle within the class of roadway obstacle (e.g., pot hole, roadway debris, and the like for temporary obstacles and traffic, speed bump, and the like for permanent obstacles). In some instances, the roadway obstacle and navigation system 125 may further request the user to provide an indication of the actuality of the roadway obstacle (e.g., whether the roadway obstacle existed and/or existed in the provided location).

At step 620, the roadway obstacle and navigation system 125 may compress the user information provided by the user corresponding to the roadway obstacle and may transmit such data to any one, or combination of, obstacle identification server 150 and route determination sever 160 in step 622.

Figure 7:
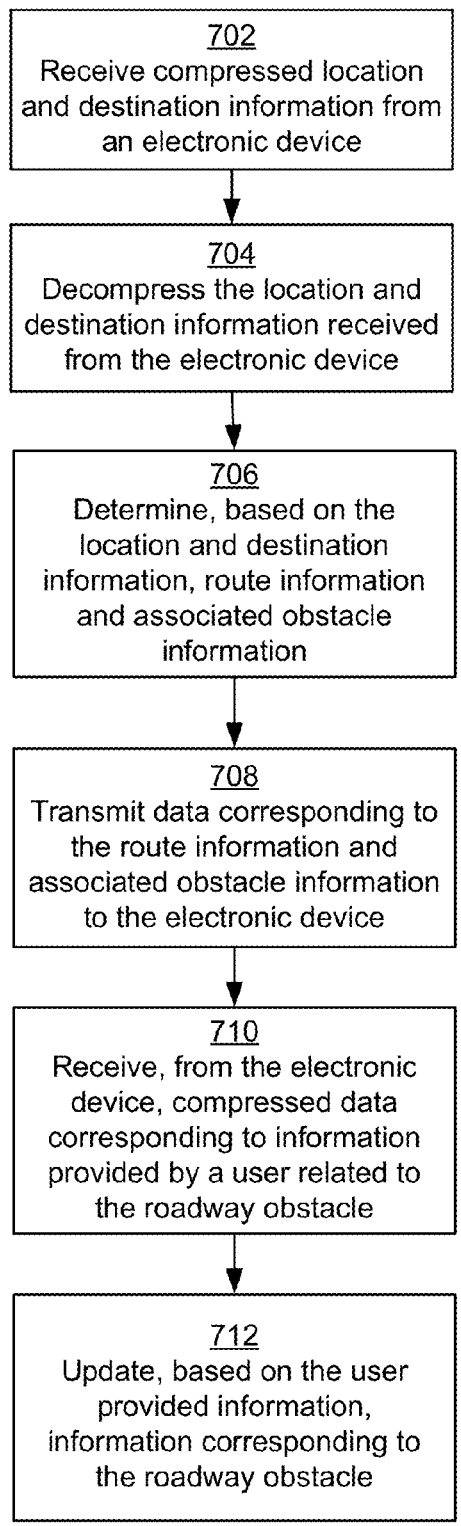
FIG. 7 is a flow diagram illustrating another example of a navigation method according to one or more aspects of the disclosure.

FIG. 7 is a flow diagram illustrating another example of the navigation method according to one or more aspects of the disclosure. At step 702 the route determination server 160 of the obstacle identification and route determination system 140 may receive compressed navigation data (e.g., location and destination information) from a roadway obstacle and navigation system 125. Upon receipt of the compressed data, the route determination server 160 may decompress the data at step 704 via decompression algorithms that mirror the compression method performed by the roadway obstacle and navigation system 125 as described above.

At step 706, after decompressing the location and destination information received from the roadway obstacle and navigation system 125, the route determination server 160 may determine, based on the location and destination information, route information and corresponding roadway obstacle information. In some instances, the determined route may be a route involving the shortest total roadway travel distance between the entered location and destination. Alternatively, the determined route may be a route involving the least amount of roadway obstacles between the entered location and destination. After determining the route information and associated obstacle information, at step 708, the route determination server 160 may transmit the data corresponding to the route information and the associated roadway obstacles to the roadway obstacle and navigation system 125.

At step 710, the route destination server 160 may receive compressed data comprising information regarding one or more of the roadway obstacles associated with the route determined by the route destination server 160 in step 706. As stated above, such information may include user provided information related to the class of the roadway obstacle which (e.g., temporary or permanent obstacle) and the type of obstacle within the class of roadway obstacle (e.g., pot hole, roadway debris, and the like for temporary obstacles and traffic, speed bump, and the like for permanent obstacles). In some instances, the data may further include an indication of the actuality of the roadway obstacle (e.g., whether the roadway obstacle existed and/or existed in the provided location).

At step 712, the route destination server 160 may update, based on the user provided information regarding one or more of the roadway obstacles associated with the determined route, information corresponding to one or more of the roadway obstacles. For example, the information provided by the user may be used to update previously undetermined information relating to one or more of the roadway obstacles including the class and type. In some instances, the user provided information may be used to revise the location data associated with the roadway obstacle, remove a roadway obstacle, and/or add a new roadway obstacle. In any event, the route destination server 160 may be configured to store the updated information corresponding to one or more of the roadway obstacles in route destination database 164.

FIG. 9 illustrates a block diagram of a computing device 901 in a roadway obstacle analysis and navigation system that may be used according to one or more illustrative embodiments of the disclosure. The computing device 901 may have a processor 903 for controlling overall operation of the computing device 901 and its associated components, including RAM 905, ROM 907, input/output module 909, and memory unit 915. The computing device 901, along with one or more additional devices (e.g., terminals 941, 951) may correspond to any of multiple systems or devices, such as roadway obstacle analysis and navigation systems, configured as described herein for performing methods corresponding to the driving event determination, roadway obstacle identification, roadway obstacle alert and assessment, and navigation.

Input/Output (I/O) module 909 may include a microphone, keypad, touch screen, and/or stylus through which a user of the computing device 901 may provide input, and may also include one or more of a speaker for providing audio input/output and a video display device for providing textual, audiovisual and/or graphical output. Software may be stored within memory unit 915 and/or other storage to provide instructions to processor 903 for enabling device 901 to perform various functions. For example, memory unit 915 may store software used by the device 901, such as an operating system 917, application programs 919, and an associated internal database 921. The memory unit 915 includes one or more of volatile and/or non-volatile computer memory to store computer-executable instructions, data, and/or other information. Processor 903 and its associated components may allow the computing device 901 to execute a series of computer-readable instructions to perform the methods described in FIGS. 2-7.

The computing device 901 may operate in a networked environment 900 supporting connections to one or more remote computers, such as terminals/devices 941 and 951. Computing device 901, and related terminals/devices 941 and 951, may include devices installed in vehicles, mobile devices that may travel within vehicles, or devices outside of vehicles that are configured to receive and process vehicle and other sensor data. Thus, the computing device 901 and terminals/devices 941 and 951 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 901. The network connections depicted in FIG. 9 include a local area network (LAN) 925 and a wide area network (WAN) 929, and a wireless telecommunications network 933, but may also include other networks. When used in a LAN networking environment, the computing device 901 may be connected to the LAN 925 through a network interface or adapter 923. When used in a WAN networking environment, the device 901 may include a modem 927 or other means for establishing communications over the WAN 929, such as network 931 (e.g., the Internet). When used in a wireless telecommunications network 933, the device 901 may include one or more transceivers, digital signal processors, and additional circuitry and software for communicating with wireless computing devices 941 (e.g., mobile phones, short-range vehicle communication systems, vehicle sensing and telematics devices) via one or more network devices 935 (e.g., base transceiver stations) in the wireless network 933.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and components described herein may be configured to communicate using any of these network protocols or technologies.

Additionally, one or more application programs 919 used by the computing device 901 may include computer executable instructions for receiving data and performing other related functions as described herein.

As will be appreciated by one of skill in the art, the various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   activating, by a roadway obstacle and navigation system including a roadway obstacle and navigation application executing on a mobile device associated with the roadway obstacle and navigation system, one or more communication interfaces of the mobile device;
   scanning, by the roadway obstacle and navigation system and via the one or more communication interfaces, for one or more of a telematics device and an on-board computer associated with a vehicle;
   responsive to detecting, via the scan, one or more of the telematics device and the on-board computer associated with the vehicle, pairing, by the roadway obstacle and navigation system and via the one or more communication interfaces, the mobile device with one or more of the telematics device and the on-board computer associated with the vehicle;
   receiving, by the roadway obstacle and navigation system and from one or more of the telematics device and the on-board computer, vehicle operational data of the vehicle;
   determining, by the roadway obstacle and navigation system and based on the vehicle operational data, whether a driving event occurred;
   responsive to determining that the driving event occurred, compressing, by the roadway obstacle and navigation system, the vehicle operational data corresponding to the driving event;
   transmitting, by the roadway obstacle and navigation system, the compressed vehicle operational data to an obstacle identification server;
   receiving, by the roadway obstacle and navigation system and from the obstacle identification server, data corresponding to one or more roadway obstacles, wherein the data corresponding to the one or more roadway obstacles includes at least location information of each of the one or more roadway obstacles;
   determining, by the roadway obstacle and navigation system, a relative location of the vehicle in relation to the location information of each of the one or more roadway obstacles; and
   determining, by the roadway obstacle and navigation system, whether the relative location of the vehicle in relation to at least one of the one or more roadway obstacles is within a predetermined threshold.

2. The method of claim 1, further comprising:
   activating, by the roadway obstacle and navigation system, a speaker of the mobile device based on determining that the relative location of the vehicle in relation to at least one of the one or more roadway obstacles is within the predetermined threshold; and
   causing, by the roadway obstacle and navigation system, the activated speaker to emit an audible tone of an increasing frequency and loudness.

3. The method of claim 1, further comprising:
   receiving, by the roadway obstacle and navigation system and via a touchscreen interface of the mobile device, location information and destination information from a user;
   transmitting, by the roadway obstacle and navigation system, the location information and the destination information to a route determination server; and
   receiving, by the roadway obstacle and navigation system and from the route determination server, route information corresponding to the location information and the destination information and data corresponding to one or more roadway obstacles along a route from a location indicated by the location information to a destination indicated by the destination information of the route information.

4. The method of claim 3, further comprising:
   activating, by the roadway obstacle and navigation system, one or more sensors of the mobile device in response to receiving the route information and the data corresponding to the one or more roadway obstacles;
   determining, by the roadway obstacle and navigation system and via the one or more activated sensors, location data of the vehicle in relation to at least one of the one or more roadway obstacles indicated in the data corresponding to the one or more roadway obstacles; and
   responsive to determining that the vehicle encountered at least one of the one or more roadway obstacles based on the location data determined via the one or more activated sensors, requesting information from the user regarding the encountered at least one of the one or more roadway obstacles, wherein the requesting the information from the user occurs after the vehicle has reached the destination.

5. The method of claim 1, wherein the determining whether the driving event occurred further comprises:
   analyzing, by the roadway obstacle and navigation application, the vehicle operational data of at least one of a vertical, horizontal, and lateral acceleration of the vehicle in relation to a predetermined threshold corresponding to at least one of the vertical, horizontal, and lateral acceleration of the vehicle.

6. The method of claim 1, further comprising:
   determining, by the roadway obstacle and navigation system, that one or more of the telematics device and the on-board computer were not registered during the scanning; and
   activating, by the roadway obstacle and navigation system, one or more sensors of the mobile device.

7. An apparatus comprising:
   a processor; and
   memory storing computer-readable instructions that, when executed by the processor, cause the apparatus to:
   activate one or more communication interfaces of a mobile device;
   scan, via the one or more communication interfaces, for one or more of a telematics device and an on-board computer associated with a vehicle;
   pair, via the one or more communication interfaces, the mobile device with one or more of the telematics device and the on-board computer associated with the vehicle;

receive, from one or more of the telematics device and the on-board computer, vehicle operational data of the vehicle;

determine, based on the vehicle operational data, whether a driving event occurred;

responsive to determining that the driving event occurred, compress the vehicle operational data corresponding to the driving event;

transmit the compressed vehicle operational data to an obstacle identification server;

receive data corresponding to one or more roadway obstacles, wherein the data corresponding to the one or more roadway obstacles includes at least location information of each of the one or more roadway obstacles;

determine a relative location of the vehicle in relation to the location information of each of the one or more roadway obstacles; and determine whether the relative location of the vehicle in relation to at least one of the one or more roadway obstacles is within a predetermined threshold.

8. The apparatus of claim 7, wherein the memory stores further computer-readable instructions that, when executed by the processor, cause the apparatus to:

activate a speaker of the mobile device based on determining that the relative location of the vehicle in relation to at least one of the one or more roadway obstacles is within the predetermined threshold; and cause the activated speaker to emit an audible tone of an increasing frequency and loudness.

9. The apparatus of claim 7, wherein the memory stores further computer-readable instructions that, when executed by the processor, cause the apparatus to:

receive, via a touchscreen interface of the mobile device, location information and destination information from a user;

transmit the location information and the destination information to a route determination server; and receive, from the route determination server, route information corresponding to the location information and the destination information and data corresponding to one or more roadway obstacles along directions from a location indicated by the location information to a destination indicated by the destination information of the route information.

10. The apparatus of claim 9, wherein the memory stores further computer-readable instructions that, when executed by the processor, cause the apparatus to:

activate one or more sensors of the mobile device in response to receiving the route information and the data corresponding to the one or more roadway obstacles;

determine, via the one or more activated sensors, location data of the vehicle in relation to at least one of the one or more roadway obstacles indicated in the data corresponding to the one or more roadway obstacles; and responsive to determining that the vehicle encountered at least one of the one or more roadway obstacles based on the location data determined via the one or more activated sensors, requesting information from the user regarding the encountered at least one of the one or more roadway obstacles, wherein the requesting the information from the user occurs after the vehicle has reached the destination.

11. The apparatus of claim 7, wherein the memory stores further computer-readable instructions that, when executed by the processor, cause the apparatus to:

analyze the vehicle operational data of at least one of a vertical, horizontal, and lateral acceleration of the vehicle in relation to a predetermined threshold corresponding to at least one of the vertical, horizontal, and lateral acceleration of the vehicle.

12. The apparatus of claim 7, wherein the memory stores further computer-readable instructions that, when executed by the processor, cause the apparatus to:

determine that one or more of the telematics device and the on-board computer were not registered during the scanning; and activate one or more sensors of the mobile device.

13. One or more non-transitory, computer-readable media having instructions stored thereon that, when executed, cause a computing device to:

activate one or more communication interfaces of a mobile device;

scan, via the one or more communication interfaces, for one or more of a telematics device and an on-board computer associated with a vehicle;

pair, via the one or more communication interfaces, the mobile device with one or more of the telematics device and the on-board computer associated with the vehicle;

receive, from one or more of the telematics device and the on-board computer, vehicle operational data of the vehicle;

determine, based on the vehicle operational data, whether a driving event occurred;

responsive to determining that the driving event occurred, compress the vehicle operational data corresponding to the driving event;

transmit the compressed vehicle operational data to an obstacle identification server;

receive data corresponding to one or more roadway obstacles, wherein the data corresponding to the one or more roadway obstacles includes at least location information of each of the one or more roadway obstacles;

determine a relative location of the vehicle in relation to the location information of each of the one or more roadway obstacles; and determine whether the relative location of the vehicle in relation to at least one of the one or more roadway obstacles is within a predetermined threshold.

14. The one or more non-transitory, computer-readable media of claim 13, having additional instructions stored thereon that, when executed, further cause the computing device to:

activate a speaker of the mobile device based on determining that the relative location of the vehicle in relation to at least one of the one or more roadway obstacles is within the predetermined threshold; and cause the activated speaker to produce an audible tone of an increasing frequency and loudness.

15. The one or more non-transitory, computer-readable media of claim 13, having additional instructions stored thereon that, when executed, further cause the computing device to:

receive via a touchscreen interface, location information and destination information from a user;

transmit the location information and the destination information to a route determination server; and receive, from the route determination server, route information corresponding to the location information and the destination information and data corresponding to one or more roadway obstacles along directions from a location indicated by the location information to a destination indicated by the destination information of the route information.

16. The one or more non-transitory, computer-readable media of claim 15, having additional instructions stored thereon that, when executed, further cause the computing device to:

activate one or more sensors of the mobile device in response to receiving the route information and the data corresponding to the one or more roadway obstacles;

determine, via the one or more activated sensors, location data of the vehicle in relation to at least one of the one or more roadway obstacles indicated in the data corresponding to the one or more roadway obstacles; and responsive to determining that the vehicle encountered at least one of the one or more roadway obstacles based on the location data determined via the one or more activated sensors, requesting information from the user regarding the encountered at least one of the one or more roadway obstacles, wherein the requesting the information from the user occurs after the vehicle has reached the destination.

17. The one or more non-transitory, computer-readable media of claim 13, having additional instructions stored thereon that, when executed, further cause the computing device to:

analyze the vehicle operational data of at least one of a vertical, horizontal, and lateral acceleration of the vehicle in relation to a predetermined threshold corresponding to at least one of the vertical, horizontal, and lateral acceleration of the vehicle.

\* \* \* \* \*